Jan. 1, 1952 M. MOONEY ET AL 2,580,815
VIBRATION ISOLATING SUPPORT
Filed Dec. 28, 1948 2 SHEETS—SHEET 2

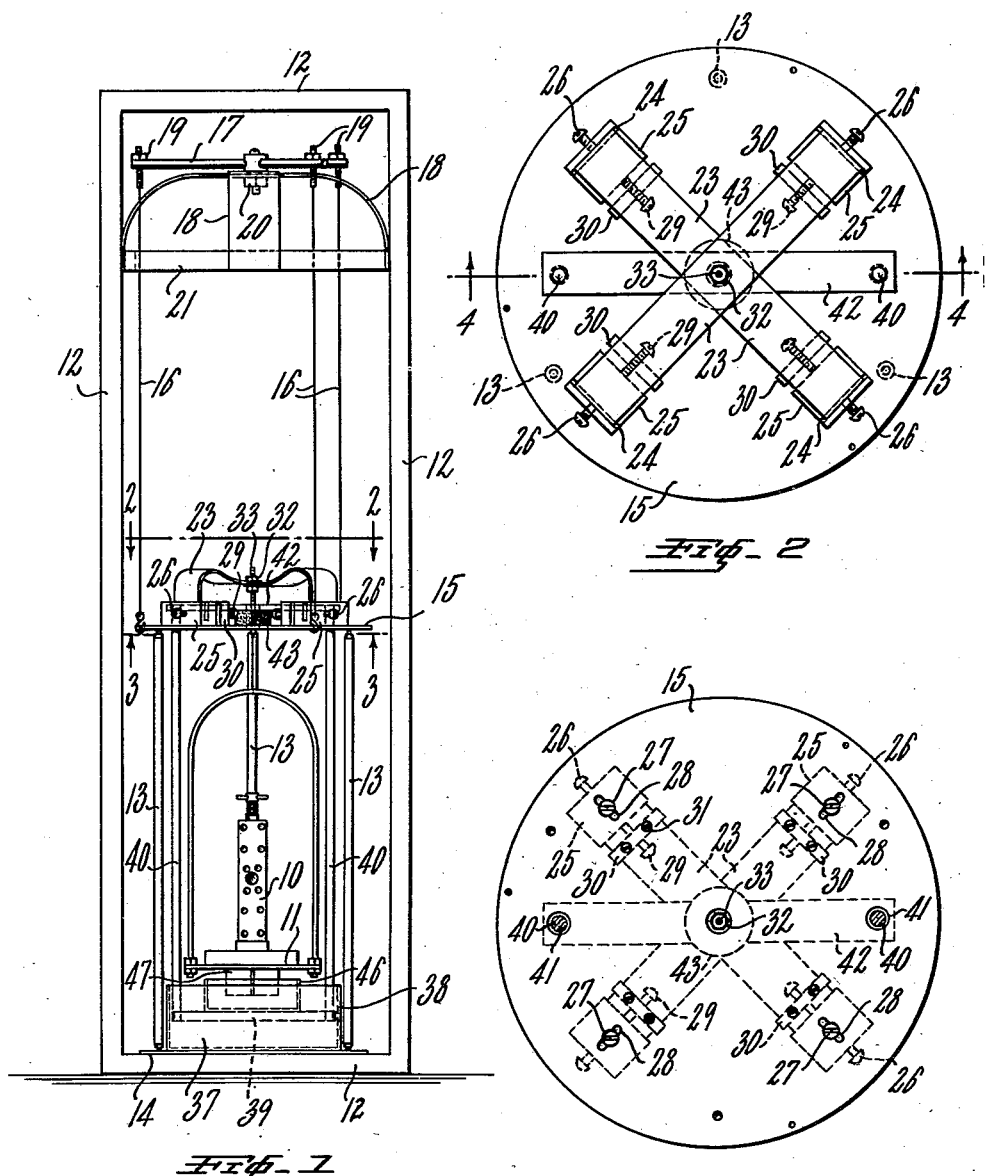

INVENTORS
MELVIN MOONEY
LLEWELLYN E. COPELAND
BY
William R. Eper
ATTORNEY

Patented Jan. 1, 1952

2,580,815

UNITED STATES PATENT OFFICE 2,580,815

VIBRATION ISOLATING SUPPORT

Melvin Mooney, Mountain Lakes, N. J., and Llewellyn E. Copeland, Des Plaines, Ill., assignors to United States Rubber Company, New York, N. Y., a corporation of New Jersey Application December 28, 1948, Serial No. 67,686

7 Claims. (Cl. 248—18)

This invention relates to a device for isolating vibrations, particularly vibrations of low frequency, e. g., 10 cycles per second or less, and substantially eliminating the transmission of vibrations of that order from one body to another.

In certain service conditions it is necessary to support machinery or delicate instruments, such as galvanometers, in such a way that appreciable transmission of the horizontal and vertical vibrations or components thereof from the support to the instruments is prevented. The devices heretofore proposed for such purposes have had certain disadvantages, including limited effectiveness, particularly at very low frequency, and they have not been capable of adjustment to the proper natural frequency required for effective isolation of vibration and efficient operation of the instrument, without the use of complicated mechanism, or a very long pendulum suspension for the instrument.

A principal object of this invention is to provide an improved type of isolating support which is simple in construction and occupies a relatively small space, and which can be adjusted to have a very long period of vibration for small amplitudes.

Broadly, our invention comprises, for isolation of the vertical vibrations, a leaf spring construction designed to give a load-deflection curve of sigmoid form, having a slope at the point of inflection equal to zero. At such point the restoring force is constant with changing deflection. Under these conditions, vertical vibrations, even of very low frequency, are substantially eliminated by our spring, as will be explained in more detail below.

To obtain isolation of vibrations in all directions, the aforesaid mechanism for isolating vertical vibrations is combined with our novel means for isolating horizontal vibrations. The means for isolating horizontal vibrations includes a supporting member for the instrument to be isolated, and vertical rods for supporting the said member and carrying part of the weight supported by it, each rod having a universal joint at each end; the remainder of the weight is carried by wires or similar flexible suspension members depending from an overhead resilient support comprising a plurality of leaf springs. When the proper relation between the lengths of the wires and rods and the proportion of the weight supported by the wires and by the rods is obtained, this mechanism is capable of substantially eliminating horizontal vibrations, even of low frequencies, as will be explained in further detail below. This mechanism employs relatively short wires, compared to the very long pendulum supports employed in certain prior art devices which were required to be suspended from a high ceiling.

Referring to the accompanying drawings:

Fig. 1 is an elevational view of a combined horizontal and vertical vibration isolating support for a galvanometer or similar sensitive instrument;

Fig. 2 is a plan view of the plate on which the system for isolating vertical vibrations is supported, and associated parts, viewed from above, as indicated by the arrows 2—2 in Fig. 1;

Fig. 3 is a bottom view of the plate shown in Fig. 2, taken on line 3—3 in Fig. 1;

Figure 4:
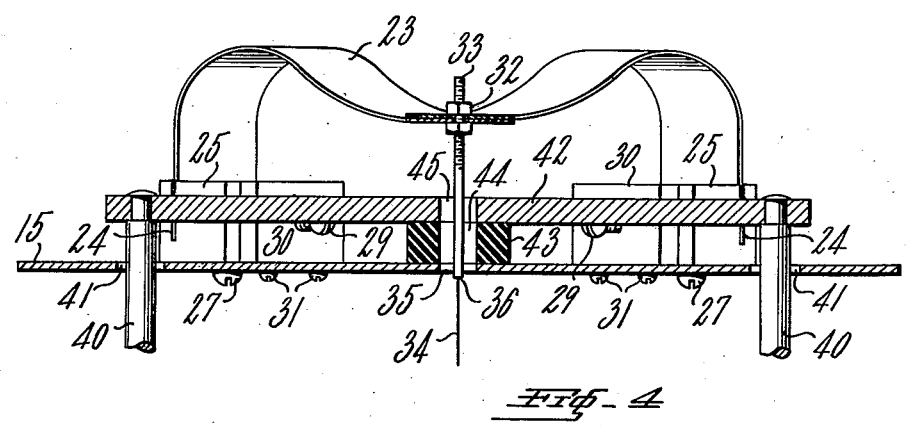
Fig. 4 is a cross-sectional view of the springs for isolating vertical vibrations with certain associated parts taken on the line 4—4 of Fig. 2.

Referring to Fig. 1, the instrument to be isolated from vibration is shown herein as a sensitive galvanometer 10 carried on an instrument pan 11. The entire apparatus for isolating the instrument from horizontal and vertical vibrations is carried on a suitable frame 12, which may be of any conventional construction.

The mechanism for isolating horizontal vibrations will first be described. This mechanism comprises three vertical supporting rods 13 which rest upon the base plate 14 and partially support a horizontal plate 15 from which the instrument pan 11 is suspended. The remainder of the weight of the plate 15 and associated parts is supported by three wires 16 extending between the plate and a spider 17, carried by the two crossed, upwardly looped overhead leaf springs 18. The wires are connected to the spider 17 by adjustable screws 19, which permit adjustment of the tension on the wires. The spider is fastened to the overhead leaf springs at the point where they cross by a bolt and nut 20. The ends of the springs 18 are fastened to a sub-frame 21 carried by the frame 12.

Figure 5:
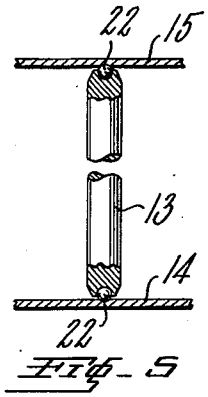
Fig. 5 represents a detailed view of the universal joints at each end of the vertical supporting rods of Fig. 1.

The vertical supporting rods 13 have suitable universal joints at each end, such as universal ball bearings 22 which fit into small depressions on the surfaces of the plates 14 and 15 (Fig. 5). Another suitable universal joint can be obtained by using rods with pointed or rounded ends fitting into suitable depressions in the plates 14 and 15. These universal joints permit the rods 13 to oscillate freely.

Our novel mechanism for isolating vertical vibrations is shown supported on the plate 15 in Figs. 1, 2 and 3, and on a larger scale in Fig. 4. The mechanism comprises two leaf springs 23, which carry the weight of the instrument to be supported. The ends of these springs are clamped in slots 24 of adjustable retaining blocks 25 by means of screws 26. The blocks are adjustably attached to the plate 15 by means of screws 27 passing through slots 28 (Fig. 3) in the plate. The distance between ends of the springs may be critically adjusted by screws 29 threaded into threaded bores in brackets 30, which are secured to the plate 15 by screws 31. The springs are fastened together at their centers by nuts 32 on a threaded rod 33 which carries the load of the instrument pan 11 and the galvanometer 10.

The instrument pan 11 is attached to the rod 33 by a flexible cord 34, which passes freely through a hole 35 in the plate 15. The thread on the upper end of the rod 33 makes it possible to adjust the vertical position of the rod so that the point of attachment 36 of the cord 34 thereto lies in the plane of the upper ends of the rods 13, which is the required condition for the most effective isolation of vibrations acting to oscillate or rotate the pan 11 and the instrument 10 carried thereby.

A suitable device 37 is associated with the galvanometer pan 11 and the plate 15 for damping horizontal and vertical movements of the pan 11 to cause it to come to rest quickly if it is accidentally disturbed. Referring to Fig. 1 of the drawings, the damping device 37 comprises a pan 38 containing machine oil. A horizontal damping plate 39 is suspended in the oil from the plate 15 by means of the vertical rods 40 which pass freely through the holes 41 in the plate 15 (Fig. 4) and are attached to a crossbar 42. The cross-bar is resiliently supported on the plate 15 by a rubber cushion 43 which is supported on the plate. The rubber cushion and the cross-bar have holes 44 and 45 therein which coincide with hole 35 in the plate 15, and through which the rod 33 passes freely. A second pan of oil 46 rests on the horizontal damping plate 39. Vertical damping plates 47 extend from the bottom of the pan 11 into the oil. The operation of this construction is such that if the supporting plate 15 or the pan 11 is accidentally disturbed the oil in pans 46 and 38 will act to restrain the movement of the damping plates 39 and 47, and thus cause the system to come to rest quickly. The rubber cushion 43 provides the preferred resilient connection between the damping plate 39 and the plate 15 through the vertical rods 40 and the cross-bar 42.

In describing the method of operation of our vibration isolating support, we will first consider the method of isolating horizontal vibrations. Referring to Fig. 1 of the drawing, it is obvious that if the rods 13 alone supported the weight of the plate 15, it would topple over. On the other hand, if the wires 16 and leaf springs alone supported the plate, it would hang suspended and would return to its position of rest if slightly displaced in any horizontal direction. With a proper combination of rod height, wire length, leaf spring constant, and weight of plate and associated parts, a condition can be obtained in which the restoring force for a horizontal displacement is very small. In the event that the restoring force is very small and the supporting base of the isolating support vibrates horizontally, the horizontal vibratory force transmitted to the supporting plate 15 will also be very small.

The necessary relation between the height of the rods, the length of the wires or other flexible suspension members, the weight supported by the rods, and the weight supported by the wires is given by the expression $$R = \frac{HW}{L}$$

wherein H represents the height of the rods, L represents the length of the wires, R represents the weight supported by the rods, and W represents the weight supported by the wires. When the characteristics of the mechanism for isolating horizontal vibrations substantially satisfy this equation, it will be found that the natural horizontal period of the supported instrument 10 becomes infinite or extremely large, and horizontal vibrations, even those of very low frequency, are effectively isolated from the plate 15 and the instrument supported therefrom. In order to obtain conditions which substantially satisfy this equation, the correct length of the wires 16 is chosen to give approximately the correct ratio of load supported by the wires to that supported by the rods. The tension in the three wires can be equalized by adjusting screws 19. Final adjustment of the load ratio in the rods 13 and wires 16 can be made by adding weights to the plate 15 until the natural horizontal period of the system is one second or more.

Figure 6:
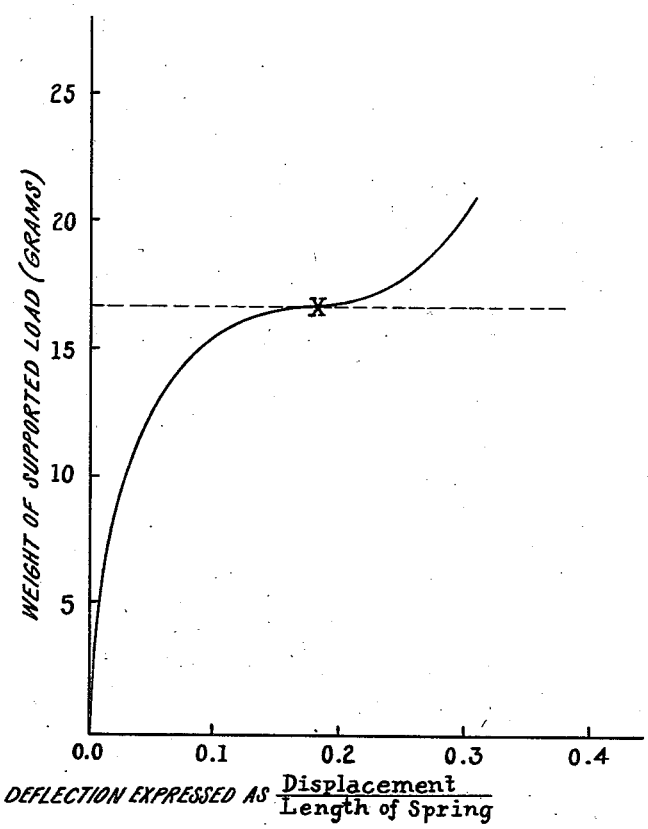
Fig. 6 represents a load-deflection curve of the springs which isolate the vertical vibrations.

Considering now the method of operation of our mechanism for isolating vertical vibrations, it is evident that the leaf springs 23, shown in Figs. 1, 2 and 4, have the form of an inverted U when not loaded. We have found that with a particular ratio of spring length to distance between the end clamping slots 24, the stress-strain curve (Fig. 6) of this type of spring, when loaded at its center, is sigmoid (i. e., having one section of positive, the other of negative curvature) in form and horizontal at the point of inflection. The shape of the load-deflection curve is shown in Fig. 6, which shows the variation in deflection (expressed as the ratio of the displacement of the spring to the length of the spring) with changing load (expressed in grams). The necessary condition for complete isolation of the supported unit from vertical vibrations is simply that the weight of the supported system must equal the force of the spring at the point of the horizontal tangent of the load-deflection curve, i. e., point X of Fig. 6. When this condition obtains, the spring necessarily has an infinite natural period of vertical oscillation, and therefore vertical vibrations, even of very low frequency, are substantially eliminated by the spring, and the supported load is effectively protected from vertical vibrations of the base.

In determining the dimensions of the spring to be used to support any given load, the equation $$\frac{FS^2}{B} = K$$

is applied, where F is the load to be supported, S is the extended length of the spring, B is the flexural rigidity of the spring, and K is a constant, determined by experiment to have a value of 50 in the particular embodiment of the invention illustrated, in which the ends of the springs are held vertically in the blocks 25. The value of K will vary with the angle which the spring 23 makes with the supporting block 25. The flexural rigidity B is defined by the equation $$B = \frac{Yt^3W}{12}$$

where Y is the Young's modulus, $t$ is the thickness, and W is the width of the spring. The distance between the spring end clamps 24 is adjusted by means of screws 29, to obtain the necessary ratio of this distance to length of spring which will result in a load-deflection curve having the required shape, viz., a curve of sigmoid form which is horizontal at the point of inflection as shown in Fig. 6.

The function of the cord 34 is mainly to prevent transmission of rotational vibrations to the supported load. This feature of our structure, while highly desirable, is not absolutely essential in every case, since the rotational disturbances encountered in practice are small. The cord 34 functions to prevent transmission of rotational oscillations most effectively when the point 36 at which the cord is attached lies in the plane of the top of the rods 13. Any rotatable filament-like connection may be used instead of the cord 34, e. g., a fine wire or a very fine chain.

It will be understood by those skilled in the art that the particular embodiment of our invention which we have illustrated and described in detail is susceptible of many modifications. Thus, the number of rods 13 used may be modified, e. g., four rods or more may be used, although more than 3 rods are unnecessary. Likewise, more than three flexible suspension members 16 may be used if desired, and more than two overhead springs 18, or more than two leaf springs 23, may be used.

The flexible suspension members, instead of being wires, may be very fine chains, or rods having a universal joint at each end, or other suitable means.

In many applications, it may be desirable to use our novel spring for eliminating vertical vibrations in place of conventional leaf springs, or clip springs, etc., for supporting apparatus or even very heavy machinery on which it is desired to absorb low frequency vibrations. In such cases one of our springs, or a plurality of our springs, may be used. In all cases the springs will be designed according to the principles set forth in detail above so that the ratio of the distance between the fixed ends of the spring and the length of the spring is such that the load-deflection curve has a point of inflection and a point of zero slope which coincide. The design load of the spring should be approximately at this point.

If desired, our device for eliminating horizontal vibrations, or our device for eliminating vertical vibrations, may be used in conjunction with known vibration isolating devices.

Having thus described our invention, what we claim and desire to protect by Letters Patent is:

1. A vibration isolating mechanism comprising a base, vertically extending rods supported on said base, a support for an instrument to be isolated, supported in part on the upper ends of said rods, each end of said rods having a universal joint, flexible, resiliently supported suspension members attached to said support and adapted to carry the remaining weight of said support and instrument, and an assembly of strip springs for supporting the instrument carried by said support, and having essentially an inverted U shape when unloaded, the dimensional relations of the parts being such that the natural frequency of vibration of the supported system both in horizontal and in vertical directions is substantially nil.

2. A vibration isolating mechanism for isolating horizontal vibrations comprising a base, vertically extending rods universally supported at one end on said base, a support for an instrument to be isolated universally supported in part on the upper ends of said rods, flexible suspension members attached to said support and adapted to carry the remaining weight of said support and instrument, and a resilient support for said flexible suspension members.

3. A spring adapted to isolate low frequency vibrations comprising a strip of spring material fixed at each end so as to have essentially an inverted U shape when unloaded, the length of the spring being given by the expression $$\frac{FS^2}{B} = K$$

where F is the magnitude of a load to be supported, S is the extended length of the spring, B is the flexural rigidity of the spring, and K is a constant, said fixed ends of the spring being spaced apart such a distance that when the spring is loaded at its center with a load of F magnitude, the load-deflection curve thereof is a sigmoid curve having zero slope at the point of inflection.

4. A supporting mechanism for isolating vibrations comprising vertical rods having a universal joint at each end carrying part of a weight to be supported, vertical flexible suspension members depending from an overhead resilient support carrying the balance of the weight to be supported, a horizontal load-supporting member carried by said vertical rods and said flexible suspension members, an assembly of strip springs arranged on said horizontal member, each of said strip springs being fixed at each end to said horizontal member so as to have essentially an inverted U shape when unloaded, the relation between the distance between the fixed ends of each strip spring and the length of each strip spring being such that the load-deflection curve at the strip spring when loaded at its center is a sigmoid curve having zero slope at the point of inflection, the length, width, and thickness of the strip spring being such that the deflection of the strip spring when normal load is applied to the center of the strip spring substantially corresponds to the point of inflection of the load-deflection curve.

5. A supporting mechanism for isolating horizontal vibrations comprising vertical rods having a universal joint at each end and carrying part of the weight to be supported, and vertical flexible suspension members depending from an overhead resilient support carrying the balance of the weight to be supported, the relation between the lengths of the rods and flexible suspension members and the proportion of the weight carried respectively by the rods and by the suspension members being such that the mechanism has a long natural period of horizontal vibration.

6. A vibration isolating mechanism comprising a system for isolating horizontal vibrations including vertical rods having a universal joint at each end and carrying part of a weight to be supported, an overhead spring support, vertical flexible suspension members depending from said overhead spring support and carrying the balance of the weight to be supported, the relation between the lengths of the rods and flexible suspension members and the portion of the weight carried by the rods and suspension members being such that the mechanism has a long natural period in horizontal vibration, and a mechanism for isolating vertical vibrations in combination with said horizontal vibration isolating mechanism comprising a horizontal member carried by said vertical rods and said flexible suspension members, at least two strip springs fixed at each end to the said horizontal member so as to have essentially an inverted U shape when unloaded, the relation between the length of each strip and the distance between the fixed ends of the strip being such that the load-deflection curve of the strip when loaded at its center is a sigmoid curve having zero slope at the point of inflection, the length, width, and thickness of the strip being such that the deflection of the spring when normal load is applied to the center of the spring substantially corresponds to the point of inflection of the load-deflection curve, whereby the said vertical vibration isolating mechanism has a long natural period in vertical vibration.

7. A vibration isolating mechanism comprising a system for isolating horizontal vibrations including vertical rods having a universal joint at each end and carrying part of a weight to be supported, an overhead strip spring support, vertical flexible suspension members depending from said overhead strip spring support and carrying the balance of the weight to be supported, the relation between the lengths of the rods and flexible suspension members and the proportion of the weight carried by the rods and suspension members being such that the mechanism has a long natural period in horizontal vibration, and a mechanism for isolating vertical vibrations in combination with the said horizontal vibration isolating mechanism comprising a horizontal member carried by said vertical rods and said flexible suspension members, at least two strip springs fixed at each end to the said horizontal member so as to have essentially an inverted U shape when unloaded, the relation between the length of each strip and the distance between the fixed ends of the strip being such that the load-deflection curve of the strip when loaded at its center is a sigmoid curve having zero slope at the point of inflection, the length, width, and thickness of the strip being such that the deflection of the spring when normal load is applied to the center of the spring substantially corresponds to the point of inflection of the load-deflection curve, whereby the said vertical vibration isolating mechanism has a long natural period in vertical vibration, and a rotatable filament-like connection between the supported load and the aforesaid vertical vibration isolating mechanism, whereby rotational vibrations are substantially eliminated.

MELVIN MOONEY.
LLEWELLYN E. COPELAND.

REFERENCES CITED

The following references are of record in the file of this patent:

UNITED STATES PATENTS

| Number | Name | Date |
|---|---|---|
| 720,042 | Marshall | Feb. 10, 1903 |
| 963,673 | Weber | July 5, 1910 |
| 1,162,138 | Clark | Nov. 30, 1915 |
| 1,811,250 | Balduf | June 23, 1931 |
| 2,442,355 | Greenslade | June 1, 1948 |